US006301533B1

(12) United States Patent
Markow

(10) Patent No.: US 6,301,533 B1
(45) Date of Patent: Oct. 9, 2001

(54) BUSINESS TRIP COMPUTER

(75) Inventor: Paul A. Markow, Huntsville, AL (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/425,545

(22) Filed: Oct. 22, 1999

(51) Int. Cl.[7] .............................. G06F 7/00; G06F 19/00

(52) U.S. Cl. ............................ 701/35; 701/201; 701/207; 701/214; 340/438; 342/357.01; 342/357.07; 342/357.08

(58) Field of Search ................................ 701/1, 35, 201, 701/207, 209, 213, 214, 215, 220; 340/438; 342/357.01, 357.06, 357.07, 357.08

(56) References Cited

U.S. PATENT DOCUMENTS

| | | | | |
|---|---|---|---|---|
| 3,908,451 | * | 9/1975 | Walker et al. | 701/123 |
| 4,188,618 | | 2/1980 | Weisbart . | |
| 4,685,061 | | 8/1987 | Whitaker . | |
| 4,755,832 | | 7/1988 | Gulas et al. . | |
| 4,875,167 | | 10/1989 | Price et al. . | |
| 4,939,652 | | 7/1990 | Steiner . | |
| 5,046,007 | | 9/1991 | McCrery et al. . | |
| 5,267,159 | | 11/1993 | O'Neall . | |
| 5,337,236 | | 8/1994 | Fogg et al. . | |
| 5,359,528 | | 10/1994 | Haendel et al. . | |
| 5,428,542 | * | 6/1995 | Liesveld | 701/35 |
| 5,541,858 | | 7/1996 | Warner . | |
| 5,550,738 | | 8/1996 | Bailey et al. . | |
| 5,557,524 | | 9/1996 | Maki . | |
| 5,579,242 | | 11/1996 | Fisher . | |
| 5,612,875 | | 3/1997 | Haendel et al. . | |
| 5,694,322 | | 12/1997 | Westerlage et al. . | |
| 5,724,316 | | 3/1998 | Brunts . | |
| 5,726,885 | | 3/1998 | Klein et al. . | |
| 5,787,373 | | 7/1998 | Migues et al. . | |
| 5,803,411 | | 9/1998 | Ackerman et al. . | |
| 5,844,473 | | 12/1998 | Kaman . | |
| 5,974,356 | * | 10/1999 | Doyle et al. | 701/209 |

* cited by examiner

*Primary Examiner*—William A. Cuchlinski, Jr.
*Assistant Examiner*—Gertrude Arthur
(74) *Attorney, Agent, or Firm*—Mark P. Calcaterra

(57) ABSTRACT

A tracking system for monitoring the use of a vehicle is provided. The tracking system includes a plurality of operational sensors, a location sensor and a data processing and recording device. The operational sensors are located within a vehicle for sensing a plurality of vehicle operating parameters and generating data signals indicative of values of the operating parameters. The vehicle location sensor determines the current location of the vehicle and generates a location signal in response thereto. During a trip, the data processing and recording device periodically samples the location signal and each of the data signals and produces data samples representative of the location signal from the location sensor and the magnitudes of the data signals from each of the operational sensors. Data may be recorded automatically, based on the input signals from the sensors, or may be manually input by the vehicle operator. At the conclusion of the trip, if the vehicle operator has not classified the trip to a specific business or personal account, the tracking system assigns a business or personal account to the trip based on the data stored in the data processing and recording device and the trip end location. A method for recording mileage traveled by a motor vehicle and attributing the mileage to a business or personal account is also provided.

6 Claims, 2 Drawing Sheets

BUSINESS TRIP COMPUTER

BACKGROUND OF THE INVENTION

1. Technical Field

The present invention relates generally to methods for monitoring mobile vehicles and more particularly to methods for collecting data on the use of a mobile vehicle in an accurate and reliable manner.

2. Discussion

The need for systems which collect and record information on the use of mobile vehicles is well known. Such systems are frequently employed to catalog the operation of a vehicle as being either business related or personal in nature. One drawback of the known systems concerns their inflexibility with which data may be input, retrieved and manipulated. For example, several known systems require the vehicle operator to identify an upcoming vehicle use as being either related to a specific business or personal account prior to the use of the vehicle. Failure to identify a particular vehicle use may cause the system to default to a mode wherein the use is permanently classified in a predetermined manner.

SUMMARY OF THE INVENTION

It is one object of the present invention to provide a tracking system for monitoring the use of a vehicle which automatically collects data pertaining to a trip.

It is another object of the present invention to provide a tracking system for monitoring the use of a vehicle which assigns a business or personal account to a trip based on either a driver input or in the absence or a driver input, the location of the trip end point.

A tracking system for monitoring the use of a vehicle is provided. The tracking system includes a plurality of operational sensors, a location sensor and a data processing and recording device. The operational sensors are located within a vehicle for sensing a plurality of vehicle operating parameters and generating data signals indicative of values of the operating parameters. The vehicle location sensor determines the current location of the vehicle and generates a location signal in response thereto. During a trip, the data processing and recording device periodically samples the location signal and each of the data signals and produces data samples representative of the location signal from the location sensor and the magnitudes of the data signals from each of the operational sensors. Data may be recorded automatically, based on the input signals from the sensors, or may be manually input by the vehicle operator. At the conclusion of the trip, if the vehicle operator has not classified the trip to a specific business or personal account, the tracking system assigns a business or personal account to the trip based on the data stored in the data processing and recording device and the trip end location. A method for recording mileage traveled by a motor vehicle and attributing the mileage to a business or personal account is also provided.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
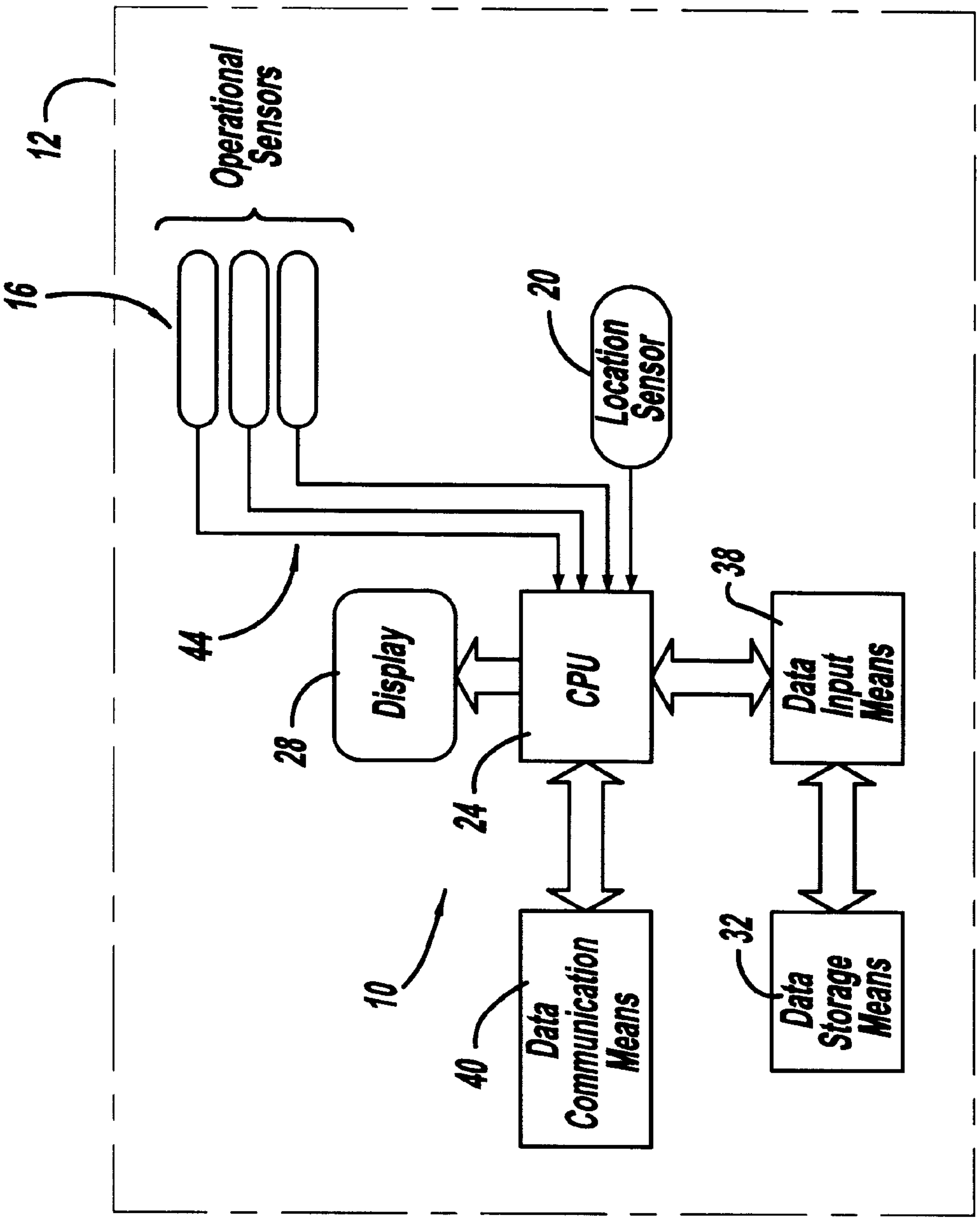
FIG. 1 is a schematic illustration of a vehicle constructed in accordance with the teachings of the present invention.

With reference to FIG. 1 of the drawings, an exemplary vehicle tracking system for practicing the method of the present invention is generally indicated by reference numeral 10. Tracking system 10 is coupled to a vehicle 12 and preferably includes a plurality of operational sensors 16, a location sensor 20, a central processing unit 24, a display 28, a data storage means 32, a data input means 36 and a data communication means 40.

The operational sensors 16 are operable for sensing a plurality of vehicle operating parameters and generating data signals indicative of the operating parameters. The operational sensors 16 include, for example, a vehicle speed sensor for monitoring the speed of vehicle 12, and a vehicle odometer for tracking the distance which vehicle 12 has traveled. Data signals generated by the operational sensors 16 is communicated via a data bus 44 to central processing unit 24.

Location sensor 20 is operable for determining the current location of vehicle 12 and generating a location signal in response thereto. Location sensor 20 preferably calculates the coordinates of vehicle 12 from information provided through various global positioning satellites (GPS). The location signal generated by location sensor 20 is transmitted to central processing unit 24.

Central processing unit 24 receives the location signal and the plurality of data signals and tracks the operation of vehicle 12. Data input means 36 and data storage means 32 permit information about specific sites to be stored and retrieved. The data for a specific site includes a first portion and a second portion. The information included in the first portion preferably includes the GPS coordinates of the site. The information included in the second portion preferably includes the name of the site, the street address, the names of various contact persons, telephone numbers for these contact persons and other miscellaneous information, including the classification of the site (e.g., personal or business).

Preferably, data input means 36 is a fixed media reading mechanism such as a compact disk drive for a map or other database storage. Alternatively, data input means 36 may also include a read/write device for a memory card or a floppy disk to permit information to be uploaded to or downloaded from data storage means 32. Data input means 36 may further include an optical data link, a radio frequency data link, a hardwire connection and/or a cellular modem to permit tracking system 10 to upload or download information as necessary. The cellular modem permits tracking system 10 to remotely link to another computer to permit information to be exchanged therebetween. This information may relate to the position of vehicle 12 or other stored data, or to vehicle maintenance, rerouted information such as e-mails and voice mail, or any other information.

Data may also be input to tracking system 10 through data input means 36. Data input means 36 preferably includes a touch pad which permits the vehicle operator to access a series of program menus to input data to central processing unit 24. Display 28 is preferably a graphic display for presentation of various types of data to the vehicle operator. Display 28 and data input means 36 permit the vehicle operator to configure and modify tracking system 10 to track the use of vehicle 12 in a desired manner. Preferably, central processing unit 24 is operable for generating a plurality of menus which permit the vehicle operator to configure and monitor tracking system 10 as desired. For example, the menus may include an operations submenu, an expenses submenu, a set-up submenu, a waypoint management submenu, a report submenu and an upload/download submenu.

The operations submenu permits the vehicle operator to configure a vehicle trip in a predetermined manner. In this regard, the operations submenu may be employed to manually classify the use of vehicle 12 to either a business or personal account, identify one or more trip end locations, calculate a route to one or more desired locations or display a map of the surrounding area. Route calculation entails determining the present location of vehicle 12 and determining the best route between the present location of vehicle 12 and one or more desired locations. The best route is determined in terms selected by the vehicle operator, such as either the shortest driving distance or the shortest driving time.

The expenses submenu permits the vehicle operator to enter information into tracking system 10 regarding various expenses incurred during a trip. Data input means 36 permits the vehicle operator to input the magnitude of an expense, an account to which the expense is to be allocated and a description of the expense.

The set-up submenu permits tracking system 10 to be configured in a desired manner. Set-up submenu may permit the language of the information to be changed between various languages, such as English, German, Spanish or French. Set-up submenu also permits the vehicle operator to configure tracking system 10 to default in a predetermined manner such that in the absence of an input from the vehicle operator, tracking system 10 will classify a particular use of vehicle 12 to a predetermined business or personal account.

The waypoint management submenu permits the information collected from or for use with location sensor 20 (i.e., a "waypoint") to be configured in a desired manner. Preferably, the waypoint management menu permits the vehicle operator to name and rename waypoints, as well as to associate a waypoint to one or more specific data fields, one of which may include a predetermined business or personal account. This aspect of tracking system 10 will be discussed in greater detail, below.

The report submenu permits the user to summarize the data in tracking system 10 and generate various standard and user-defined reports. Information in the reports may pertain to the operation of the vehicle, the expenses logged by the vehicle operator, vehicle maintenance, waypoint lists or the use of vehicle 12 for a particular period of time, project or waypoint.

The upload/download submenu permits the user to upload information from or download information to tracking system 10. Information downloaded from tracking system 10 may be manipulated or reviewed on a remote terminal, such as a lap top computer, thus permitting the user to refine the data collected by tracking system 10 under more comfortable and ergonomic conditions. Uploading information to tracking system 10 permits tracking system 10 to be tailored to the individual user. This may be especially advantageous where a pool of vehicles is used by a plurality of users, as tracking system 10 does not require that a user continually use the same vehicle. The uploading/downloading of information is also advantageous in that information such as that pertaining to various waypoints may be networked to various other users, as when a person's responsibilities for a given geographical area are transferred to another person.

The set-up menu of tracking system 10 is initially accessed and tracking system 10 is set-up in a desired manner (e.g., language, default account classification). In the particular example provided herein, tracking system 10 is initially set-up such that in the absence of an input from the vehicle operator, tracking system 10 will operate in a default mode wherein the particular use is classified as being personal in nature.

Figure 2:
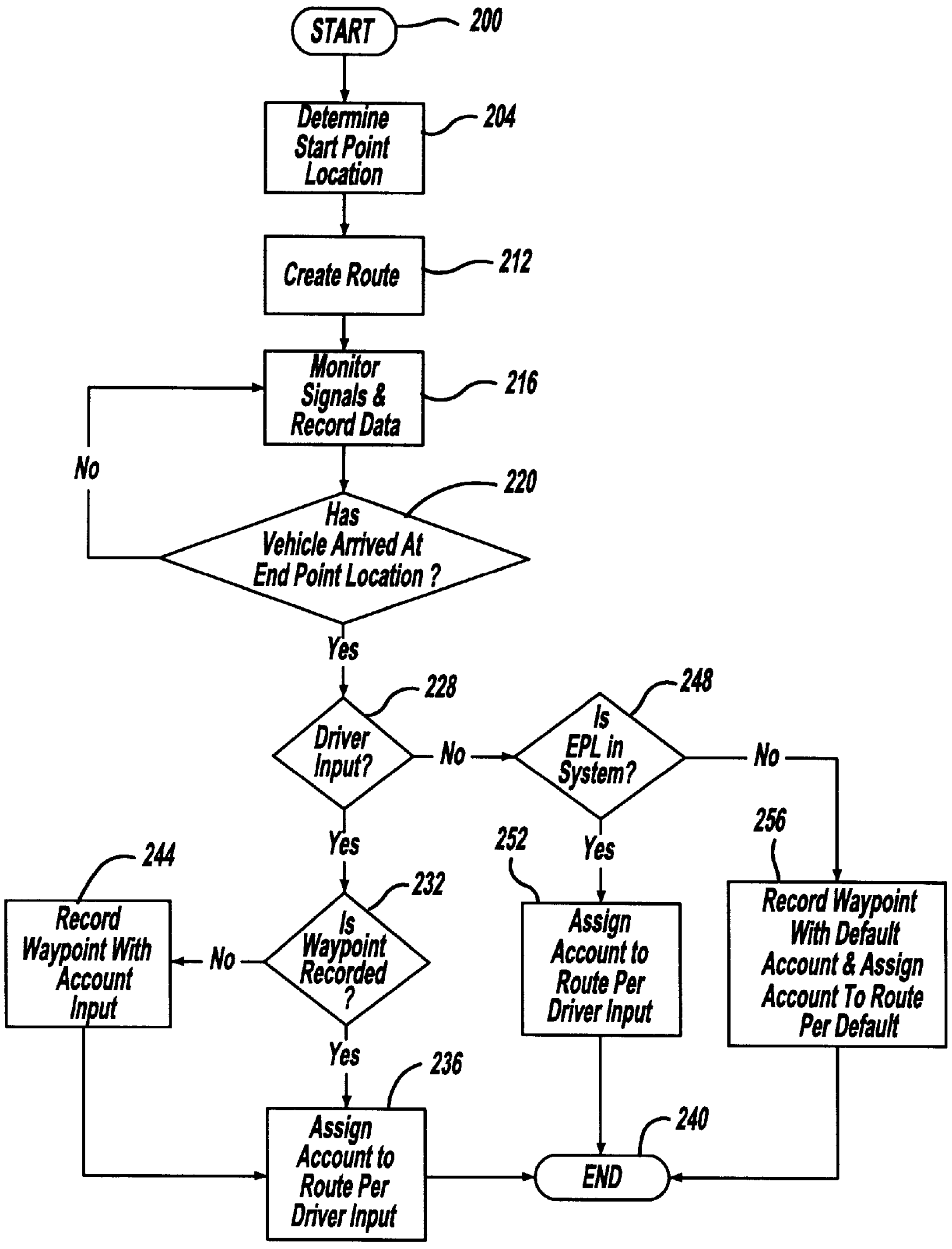
FIG. 2 is a schematic illustration of the method of the present invention in flowchart form.

In FIG. 2, a schematic diagram of the operation of tracking system is shown in flowchart format. The methodology is entered through bubble 200 and progresses to block 204. Preferably, the methodology is started each time vehicle 12 is started. In block 204, the methodology determines the start point location of the trip (i.e., the present location of vehicle 12). As mentioned above, this may be performed through the use of GPS data. The methodology next proceeds to block 212.

In block 212, the methodology creates a route to record data taken during the trip. The route is minimally configured to include memory storage locations for the start point location, the end point location, an identification of the account for which the vehicle use is to be attributed and the distance traveled between the start and end point locations. Depending upon the desired complexity of tracking system, the route may be configured to also include date and time indicators and progress waypoints which show the progress of vehicle 12 during the course of the trip. In the example provided, the route is initialized with a temporary route account which will be updated at a later point in the methodology.

Tracking system 10 may also be configured to record other information, such as the location of vehicle 12 when certain vehicle conditions are logged (e.g., vehicle speed in excess of a predetermined maximum speed or the generation of one or more predetermined engine fault codes). If the vehicle operator stops vehicle 12 during the trip and incurs an expense, such as a toll or the purchase of fuel, the expense submenu may be accessed to record such information.

The methodology then proceeds to block 216 where the data and location signals are monitored and data samples are recorded to the route. As discussed above, tracking system 10 is coupled to the vehicle data bus which permits tracking system 10 to log the actual mileage of the trip. The methodology next proceeds to decision block 220 where tracking system determines if the trip has been completed (i.e., if the vehicle 12 has arrived at the end point location). Tracking system 10 may be programmed to identify the completion of a trip based on a number of predetermined conditions, such as turning off the vehicle ignition, arriving at a preselected waypoint or receiving an input from the vehicle operator identifying the end point location of the trip. If tracking system 10 determines that vehicle 12 has not arrived at the end point location, the methodology loops back to block 216. If vehicle 12 determines that vehicle 12 has arrived at the end point location, the methodology proceeds to decision block 228.

In decision block 228, the methodology determines whether the vehicle operator has provided an input to classify the trip to a predetermined business or personal account. Those skilled in the art should readily understand that the driver input classifying the trip in a desired manner may be input at any time prior to or during the trip. If the vehicle operator has provided an input to classify the trip, the methodology proceeds to decision block 232 where the tracking system determines whether the waypoint for the end point location has been recorded to the data storage means 32. If the waypoint for the end point location has been recorded to the data storage means 32, the methodology proceeds to block 236 where the account input by the vehicle operator is assigned to the route and the route is recorded to the data storage means 32. The methodology then proceeds to bubble 240 where the methodology terminates.

Returning to decision block 232, if tracking system 10 determines that the waypoint for the end point location has not been recorded, tracking system 10 causes the waypoint to be saved to data storage means 32. As waypoint data includes information about a business or personal account, the account input by the vehicle operator is also saved to data storage means 32. The methodology then advances to block 236 and proceeds as discussed above.

Returning to block 228, if the vehicle operator has not provided an input to classify the trip, the methodology proceeds to decision block 248 where tracking system compares the waypoint for the end point location to the waypoints stored in the data storage means 32. If the waypoint for the end point location had been previously stored to the data storage means 32, the methodology proceeds to block 252 where the information, including the business or personal account, is retrieved and stored into the route. The route is then stored to data storage means 32.

Returning to decision block 248, if the waypoint for the end point location had not been previously stored to the data storage means 32, the methodology proceeds to block 256 where the waypoint for the end point location is stored to the data storage means 32. In saving the waypoint, the default account is included. Tracking next stores the route to data storage means 32, using the default account to classify the trip.

Data collected in a route may be analyzed and/or administered during the trip or thereafter, either automatically or manually. For example, tracking system 10 may be programmed to automatically alter the data stored in a route when a change is recorded to data storage means 32 indicating that the classification of an end point location has been changed. Such a change would occur, for example, when a trip is classified to one account, either through default or through an error on the part of the vehicle operator, and the vehicle operator subsequently changes the classification of the waypoint for the end point location to a different classification.

Manual administration of the data in a route may be conveniently undertaken either in vehicle or on a remote terminal after a trip has been completed. Several avenues may be utilized to manually administer route data. For example, the waypoint manipulation submenu may be accessed to label a waypoint and associate it with a particular business or personal account. After a post-trip alteration to a waypoint has been made, tracking system 10 may be actuated to automatically reclassify trips as to a predetermined business or personal account. The vehicle operator may also reclassify trips in a completely manual manner, regardless of whether the starting and ending waypoints have been identified as being personal or business related.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A vehicle monitoring, recording and analyzing system comprising:

- a plurality of operational sensors located within the vehicle for sensing a plurality of vehicle operating parameters, the sensors generating data signals indicative of values of the operating parameters;
- a vehicle location sensor for determining a current location of the vehicle and generating a location signal in response thereto; and
- a data processing and recording device coupled to the vehicle location sensor and the operational sensors, the data processing and recording device including a central processing unit, a data storage means, a data communication means and a data input means, the central processing unit operable for periodically sampling the location signal and each of the data signals and producing data samples representative of the location signal from the location sensor and the magnitudes of the data signals from each of the operational sensors, one of the data samples corresponding to a trip end point, the data storage means operable for receiving and storing the data samples, the data communication means operable in a first mode to upload data to the data storage means, the data communication means operable in a second mode to download data from the data storage means, the data input means operable for communicating a driver input to the central processing unit;

wherein the central processing unit determines mileage traveled during a trip from the data samples and, in absence of a driver input, attributes the mileage to a business account or a personal account based on the data sample corresponding to the trip end point.

2. The vehicle monitoring, recording and analyzing system of claim 1, wherein the central processing unit is further operable for determining a route upon input of a desired trip end point.

3. The vehicle monitoring, recording and analyzing system of claim 1, wherein the data communication means includes a device selected from a group of devices consisting of a memory card, a floppy disk, an optical data link, a radio-frequency data link and a modem.

4. The vehicle monitoring, recording and analyzing system of claim 1, wherein the data stored in the data storage means includes expenses incurred during a trip.

5. The vehicle monitoring, recording and analyzing system of claim 1, wherein the data stored in the data storage means includes a first portion having coordinates for use with a global positioning satellite system.

6. The vehicle monitoring, recording and analyzing system of claim 1, wherein the data stored in the data storage means includes a second portion having a destination name and a destination address.

* * * * *